(12) United States Patent
Hoshi et al.

(10) Patent No.: US 11,808,173 B2
(45) Date of Patent: Nov. 7, 2023

(54) TURBOCHARGER TURBINE HOUSING SCROLL PASSAGE

(71) Applicant: MITSUBISHI HEAVY INDUSTRIES ENGINE & TURBOCHARGER, LTD., Sagamihara (JP)

(72) Inventors: Toru Hoshi, Tokyo (JP); Hiroshi Nakagawa, Sagamihara (JP); Shunsuke Miyoshi, Sagamihara (JP); Kenji Nitta, Sagamihara (JP); Sosuke Irie, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 17/781,970

(22) PCT Filed: Jan. 7, 2020

(86) PCT No.: PCT/JP2020/000151
§ 371 (c)(1),
(2) Date: Jun. 2, 2022

(87) PCT Pub. No.: WO2021/140562
PCT Pub. Date: Jul. 15, 2021

(65) Prior Publication Data
US 2023/0020581 A1 Jan. 19, 2023

(51) Int. Cl.
*F01D 9/02* (2006.01)
*F01D 25/24* (2006.01)

(52) U.S. Cl.
CPC .............. *F01D 9/026* (2013.01); *F01D 25/24* (2013.01); *F05D 2220/40* (2013.01); *F05D 2240/14* (2013.01); *F05D 2250/38* (2013.01)

(58) Field of Classification Search
CPC .......... F01D 9/026; F01D 25/24; F02B 37/00; F05D 2220/40; F05D 2240/14; F05D 2250/38; F05D 2250/12; Y02T 10/12
(Continued)

(56) References Cited

U.S. PATENT DOCUMENTS

2019/0234237 A1  8/2019  Kitamura et al.

FOREIGN PATENT DOCUMENTS

| JP | 61-126001 U | 8/1986 |
| JP | 2009221919 A * | 10/2009 |

(Continued)

OTHER PUBLICATIONS

WO-2015002228-A1, translation, Jan. 2015 (Year: 2015).*
(Continued)

*Primary Examiner* — J. Todd Newton
(74) *Attorney, Agent, or Firm* — Birch, Stewart, Kolasch & Birch, LLP

(57) ABSTRACT

A scroll passage of a turbine housing includes: an outer peripheral surface extending along an axial direction of the turbine housing; an inner peripheral surface disposed inward of the outer peripheral surface; a one-side surface extending along the radial direction; an other-side surface disposed closer to an outlet of the housing; a one-side outer peripheral R portion connecting the one-side surface and the outer peripheral surface; an other-side outer peripheral R portion connecting the other-side surface and the outer peripheral surface; and an other-side inner peripheral R portion connecting the other-side surface and the inner peripheral surface. A ratio of a width dimension of the scroll passage to an R dimension of each portion is defined as a peripheral R ratio, and the peripheral R ratio has an R ratio increasing region the ratio increases from upstream to downstream in the scroll passage.

8 Claims, 7 Drawing Sheets

(58) Field of Classification Search
USPC .......................................................... 415/205
See application file for complete search history.

(56) References Cited

FOREIGN PATENT DOCUMENTS

| | | | | |
|---|---|---|---|---|
| JP | 2010209824 A | * | 9/2010 | |
| JP | 2018-96267 A | | 6/2018 | |
| WO | WO-2012090649 A1 | * | 7/2012 | ........... F04D 29/403 |
| WO | WO-2015002228 A1 | * | 1/2015 | ............ F01D 9/026 |

OTHER PUBLICATIONS

JP-2010209824-A, translation, Sep. 2010 (Year: 2010).*
WO-2012090649-A1, translation, Jul. 2012 (Year: 2012).*
JP-2009221919-A, translation, Oct. 2009 (Year: 2009).*
International Preliminary Report on Patentability and English translation of the Written Opinion of the International Searching Authority for International Application No. PCT/JP2020/000151, dated Jul. 21, 2022.
International Search Report and Written Opinion of the International Searching Authority for International Application No. PCT/JP2020/000151, dated Feb. 18, 2020.

* cited by examiner

TURBOCHARGER TURBINE HOUSING SCROLL PASSAGE

TECHNICAL FIELD

The present disclosure relates to a turbine housing and a turbocharger.

BACKGROUND

A vehicle or the like may be provided with a turbocharger which rotates a turbine rotor by using energy of exhaust gas discharged from an engine, and in turn rotates a compressor wheel installed coaxially with the turbine rotor to supercharge the air, in order to improve engine output.

Patent Document 1 discloses that a turbine housing of a turbocharger has a scroll passage through which exhaust gas immediately after being discharged from an engine flows, and this scroll passage has a rectangular cross-sectional shape.

CITATION LIST

Patent Literature

Patent Document 1: JP2018-96267A

SUMMARY

Problems to be Solved

When the scroll passage has a rectangular cross-sectional shape, the stress due to thermal expansion is concentrated on the corner portions of the scroll passage, and this stress may damage the scroll passage. However, Patent Document 1 does not mention the concentration of stress on the corner portions of the scroll passage.

The present disclosure was made in view of the above problem, and an object thereof is to provide a turbine housing that can suppress the damage to the scroll passage.

Solution to the Problems

To achieve the above object, a turbine housing according to the present disclosure has a scroll passage. The scroll passage includes: an outer peripheral surface extending along an axial direction of the turbine housing; an inner peripheral surface disposed inward of the outer peripheral surface in a radial direction of the turbine housing; a one-side surface, which is a side surface on one side in the axial direction of the turbine housing, extending along the radial direction of the turbine housing; an other-side surface, which is a side surface on another side in the axial direction of the turbine housing, disposed closer to an outlet of the turbine housing than the one-side surface and extending along the radial direction of the turbine housing; a one-side outer peripheral R portion connecting an outer peripheral end of the one-side surface and a one-side end of the outer peripheral surface; an other-side outer peripheral R portion connecting an outer peripheral end of the other-side surface and an other-side end of the outer peripheral surface; and an other-side inner peripheral R portion connecting an inner peripheral end of the other-side surface and an other-side end of the inner peripheral surface. In a cross-sectional view of the scroll passage, when a ratio of a width dimension of the scroll passage along the axial direction to an R dimension of each of the one-side outer peripheral R portion, the other-side outer peripheral R portion, and the other-side inner peripheral R portion is defined as a one-side outer peripheral R ratio, an other-side outer peripheral R ratio, and an other-side inner peripheral R ratio, respectively, the scroll passage has an R ratio increasing region where at least one of the one-side outer peripheral R ratio, the other-side outer peripheral R ratio, and the other-side inner peripheral R ratio increases from upstream to downstream in the scroll passage.

Advantageous Effects

According to the turbine housing, since the R ratio (one-side outer peripheral R ratio, other-side outer peripheral R ratio, and other-side inner peripheral R ratio) of at least one of the corner portions (one-side outer peripheral R portion, other-side outer peripheral R portion, and other-side inner peripheral R portion) of the scroll passage increases from upstream to downstream in the scroll passage, the concentration of stress due to thermal expansion can be suppressed, and the damage to the scroll passage can be suppressed.

DETAILED DESCRIPTION

Hereinafter, a turbine housing and a turbocharger according to embodiments of the present disclosure will be described with reference to the drawings. The following embodiments are illustrative and not intended to limit the present disclosure, and various modifications are possible within the scope of technical ideas of the present disclosure.

First Embodiment (Configuration of Turbocharger)

Figure 1:
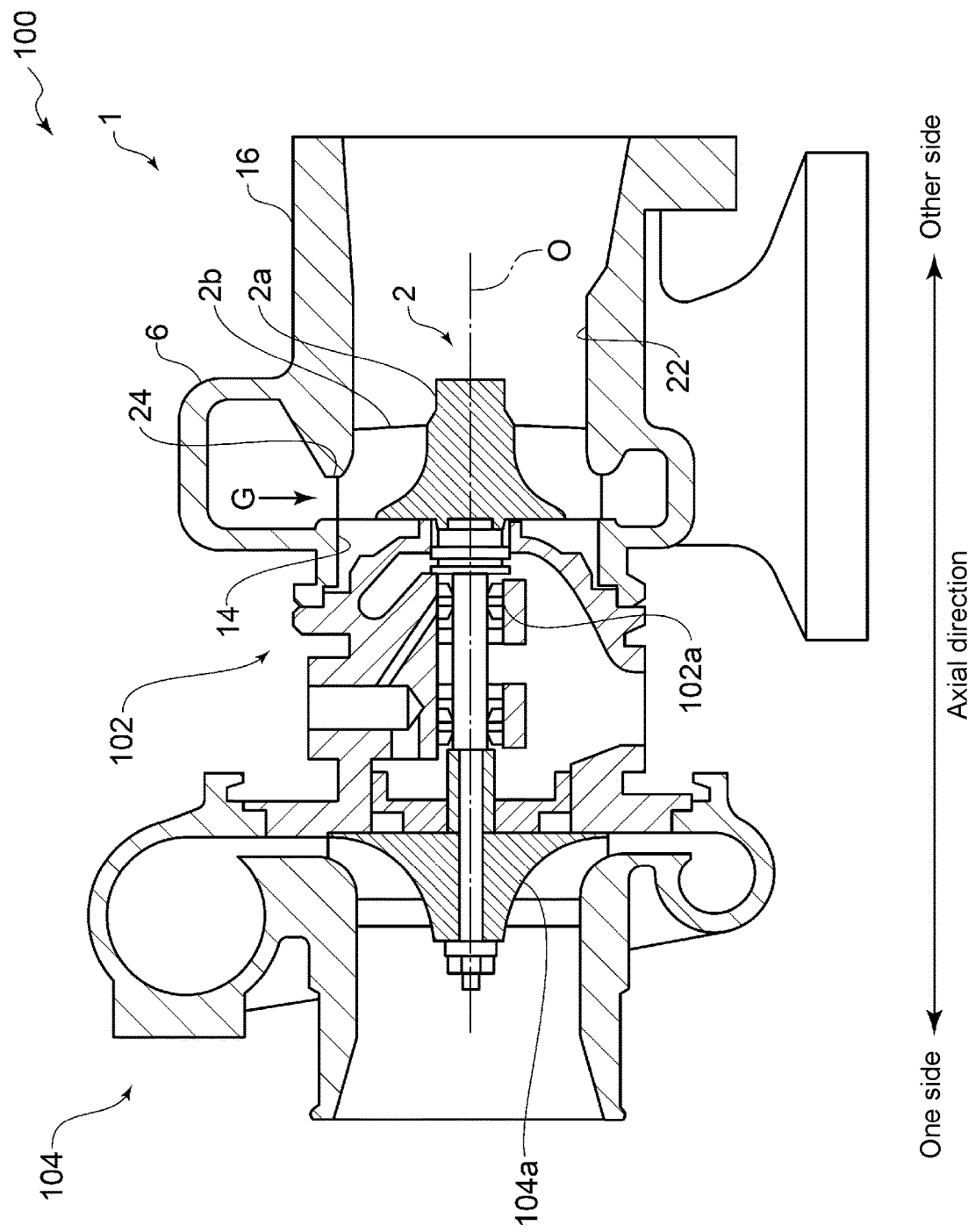
FIG. 1 is a cross-sectional view of a turbocharger according to the first embodiment of the present disclosure.
Figure 2:
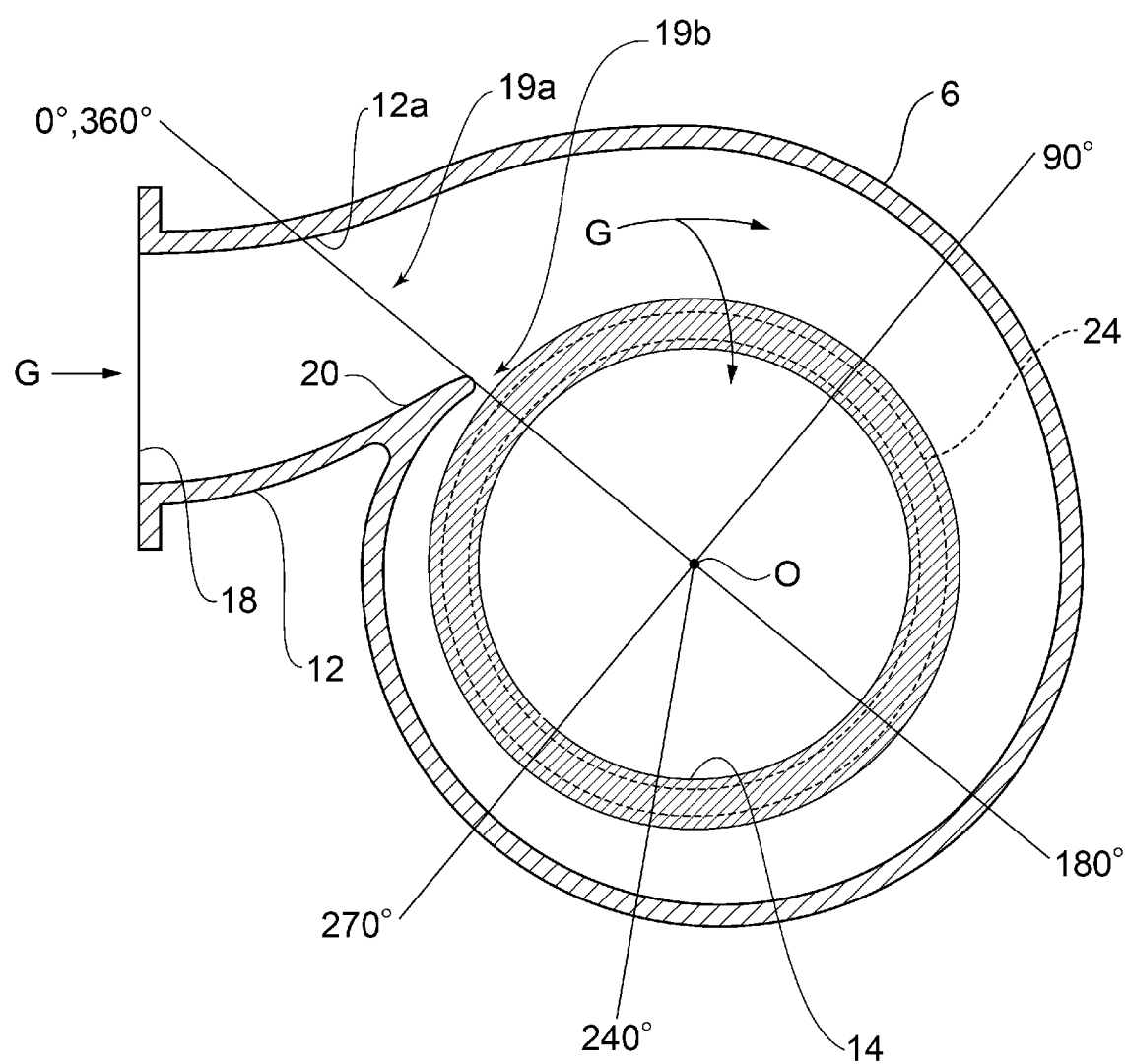
FIG. 2 is a schematic configuration diagram of a part of the configuration of a turbine housing according to the first embodiment of the present disclosure.
Figure 3:
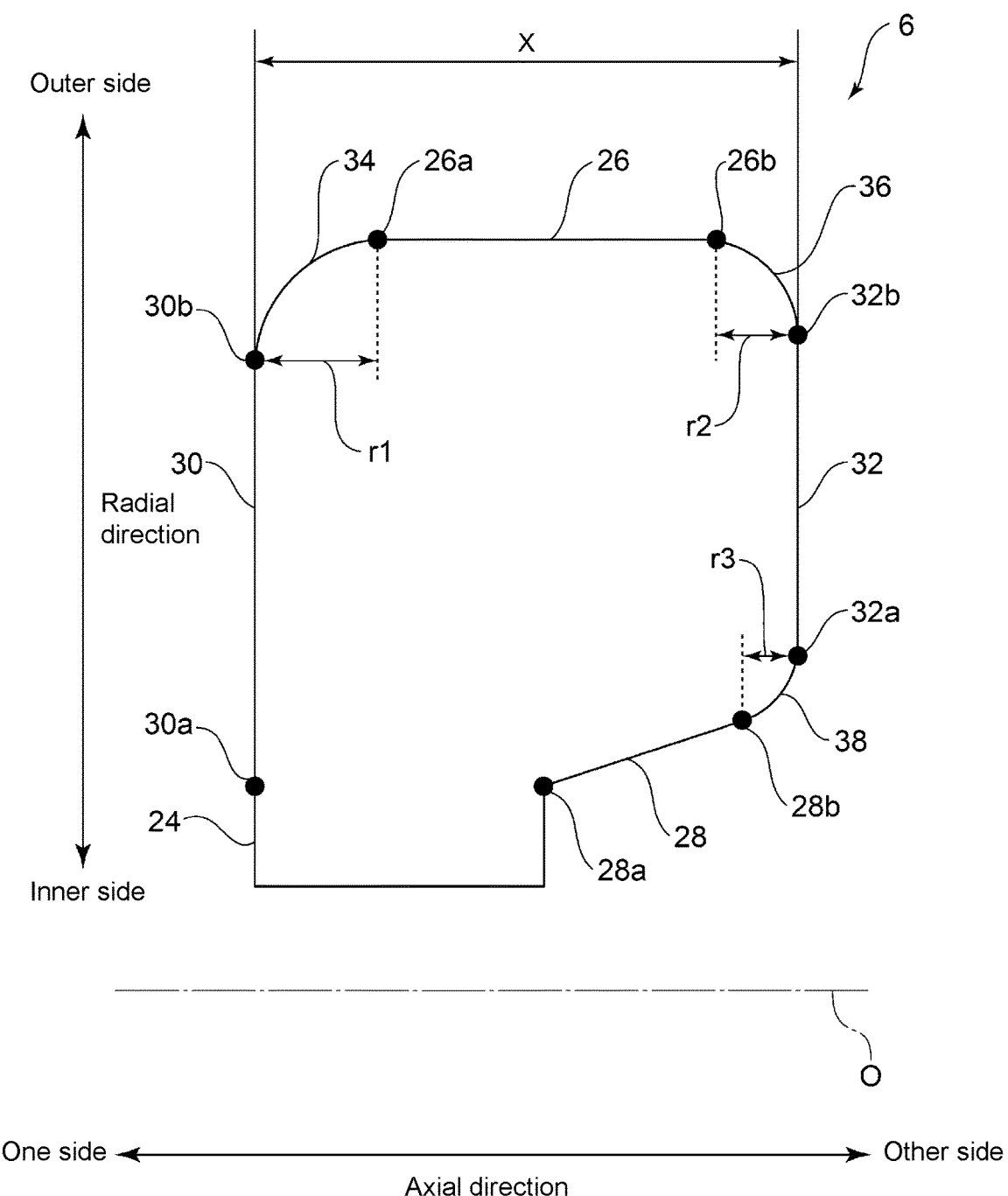
FIG. 3 is a schematic cross-sectional view of a scroll passage according to the first embodiment of the present disclosure.

The configuration of a turbine housing 1 according to the first embodiment of the present disclosure will be described. FIG. 1 is a cross-sectional view of a turbocharger according to the first embodiment of the present disclosure. FIG. 2 is a schematic configuration diagram of a part of the configuration of a turbine housing according to the first embodiment of the present disclosure. FIG. 3 is a schematic cross-sectional view of a scroll passage according to the first embodiment of the present disclosure.

A turbocharger 100 according to the first embodiment of the present disclosure is an exhaust turbocharger for supercharging air to an engine mounted on a vehicle such as an automobile. As shown in FIG. 1, the turbocharger 100 has a turbine housing 1, a bearing housing 102, and a compressor housing 104.

The turbine housing 1 accommodates a turbine rotor 2 including a hub 2a and a plurality of turbine blades 2b disposed on the outer peripheral surface of the hub 2a. Further, the turbine housing 1 has a scroll passage 6 for introducing the exhaust gas G discharged from the engine to the turbine rotor 2. The scroll passage 6 will be described later. The bearing housing 102 accommodates a bearing 102a which supports the turbine rotor 2 in a rotatable manner about a rotation axis O (rotor shaft). The rotation axis O is the axis of the turbine housing 1. The compressor housing 104 rotatably accommodates a compressor wheel 104a connected to the turbine rotor 2 via the rotation axis O (rotor shaft).

Hereinafter, the direction of a circular locus drawn by rotation around the rotation axis O will be referred to as the "circumferential direction", and the radial direction of the circular locus will be referred to as the "radial direction". This "radial direction" has the same meaning as the radial direction of the turbine housing 1. Further, the axial direction (direction of rotation axis O) of the turbine housing 1 will simply be referred to as the "axial direction".

(Configuration of Turbine Housing)

As shown in FIGS. 1 to 2, the turbine housing 1 has a scroll passage 6. In the first embodiment, the turbine housing 1 has, in addition to the scroll passage 6 (see FIGS. 1 and 2), an introduction passage 12 (see FIG. 2), a turbine chamber 14 (see FIGS. 1 and 2), and a discharge passage 16 (see FIG. 1).

The introduction passage 12 is a passage through which the exhaust gas G immediately after being introduced into the turbine housing 6 flows. The introduction passage 12 has an exhaust gas inlet portion 18. The exhaust gas G discharged from the engine is introduced into the turbine housing 1 through the exhaust gas inlet portion 18. An inlet portion 19a of the scroll passage 6 is connected to an end portion 12a of the introduction passage 12 opposite to the exhaust gas inlet portion 18 so that the exhaust gas G flowing through the introduction passage 12 is introduced into the scroll passage 6. The turbine chamber 14 is a space for accommodating the turbine rotor 2 and has an opening portion 22 that opens toward the other side in the axial direction. The turbine chamber 14 is located radially inward of the scroll passage 6, and as will be described later, the exhaust gas G flowing out of the scroll passage 6 is introduced through a communication passage 24 into the turbine chamber 14. The discharge passage 16 is connected to the opening portion 22 of the turbine chamber 14 so that the exhaust gas G flowing through the turbine chamber 14 is introduced into the discharge passage 16. The exhaust gas G introduced into the discharge passage 16 is discharged from the turbine housing 1 through an exhaust gas outlet (not shown).

The scroll passage 6 is configured to have an annular shape from the end portion 12a of the introduction passage 12. Further, the boundary portion between the inlet portion 19a and the outlet portion 19b of the scroll passage 6 is formed by a tongue portion 20. The inlet portion 19a and the outlet portion 19b of the scroll passage 6 communicate with each other so that the exhaust gas G that has passed through the outlet portion 19b of the scroll passage 6 rejoins the inlet portion 19a of the scroll passage 6.

Hereinafter, as shown in FIG. 2, the angular position of the winding start portion (tongue portion 20) of the scroll passage 6 about the rotation axis O (axis of the turbine housing 1) is defined as 0 degrees, and the angular position of the winding end portion (tongue portion 20) of the scroll passage 6 about the rotation axis O is defined as 360 degrees. The angular position increases along the direction in which the exhaust gas G flows in the scroll passage 6 from upstream to downstream.

Further, the scroll passage 6 is configured such that the cross-section increases from upstream to downstream. A communication passage 24 connecting the scroll passage 6 and the turbine chamber 14 over the entire circumference is disposed radially inward of the scroll passage 6. Accordingly, a part of the exhaust gas G in the scroll passage 6 flows into the turbine chamber 14 through the communication passage 24 while moving along a circular locus.

(Configuration of Scroll Passage)

As shown in FIG. 3, in a cross section of the scroll passage 6, the scroll passage 6 includes an outer peripheral surface 26, an inner peripheral surface 28, a one-side surface 30, an other-side surface 32, a one-side outer peripheral R portion 34, an other-side outer peripheral R portion 36, and an other-side inner peripheral R portion 38. The scroll passage 6 is configured to have a substantially rectangular flow passage cross-section. FIG. 3 schematically shows the cross-section of the scroll passage 6 at an angular position of 0 degrees.

The outer peripheral surface 26 is a portion extending along the axial (rotation axis O) direction. The inner peripheral surface 28 is a portion disposed radially inward of the outer peripheral surface 26. The one-side surface 30 is a side surface on one side in the axial direction and a portion extending along the radial direction. The other-side surface 32 is a side surface on the other side in the axial direction and a portion disposed axially on the other side (on the side closer to the outlet of the turbine housing 1) of the one-side surface 30 and extending along the radial direction.

In the first embodiment, the outer peripheral surface 26 extends along a direction parallel to the axial direction. The inner peripheral surface 28 is inclined so as to approach the rotation axis O toward one side in the axial direction. A one-side end 28a of the inner peripheral surface 28 and an inner peripheral end 30a of the one-side surface 30 are connected to the communication passage 24. In the present embodiment, the one-side surface 30 and the inner surface of the communication passage 24 are flush with each other, but the present disclosure is not limited to this embodiment. A step portion may be provided between the one-side surface 30 and the communication passage 24.

The one-side outer peripheral R portion 34 is a portion connecting an outer peripheral end 30b of the one-side surface 30 and a one-side end 26a of the outer peripheral surface 26. The other-side outer peripheral R portion 36 is a portion connecting an outer peripheral end 32b of the other-side surface 32 and an other-side end 26b of the outer peripheral surface 26. The other-side inner peripheral R portion 38 is a portion connecting an inner peripheral end 32a of the other-side surface 32 and an other-side end 28b of the inner peripheral surface 28. Each of the one-side outer peripheral R portion 34, the other-side outer peripheral R portion 36, and the other-side inner peripheral R portion 38 has an arc shape.

Here, a ratio of the width dimension X of the scroll passage 6 along the axial direction to the R dimension of each of the one-side outer peripheral R portion 34, the other-side outer peripheral R portion 36, and the other-side inner peripheral R portion 38 is defined as a one-side outer peripheral R ratio R1 (=r1/X), an other-side outer peripheral R ratio R2 (=r2/X), and an other-side inner peripheral R ratio R3 (=r3/X), respectively. In the first embodiment, each R dimension r1, r2, r3 is the magnitude extending along a direction parallel to the axial direction. That is, r1 is the magnitude of the distance between the outer peripheral end 30b of the one-side surface 30 and the one-side end 26a of the outer peripheral surface 26 in the axial direction. Similarly, r2 is the magnitude of the distance between the outer peripheral end 32b of the other-side surface 32 and the other-side end 26b of the outer peripheral surface 26 in the axial direction. Similarly, r3 is the magnitude of the distance between the inner peripheral end 32a of the other-side surface 32 and the other-side end 28b of the inner peripheral surface 28 in the axial direction. However, the present disclosure is not limited to this embodiment. In some embodiments, each R dimension r1, r2, r3 may be the magnitude extending along a direction parallel to the radial direction.

Figure 4:
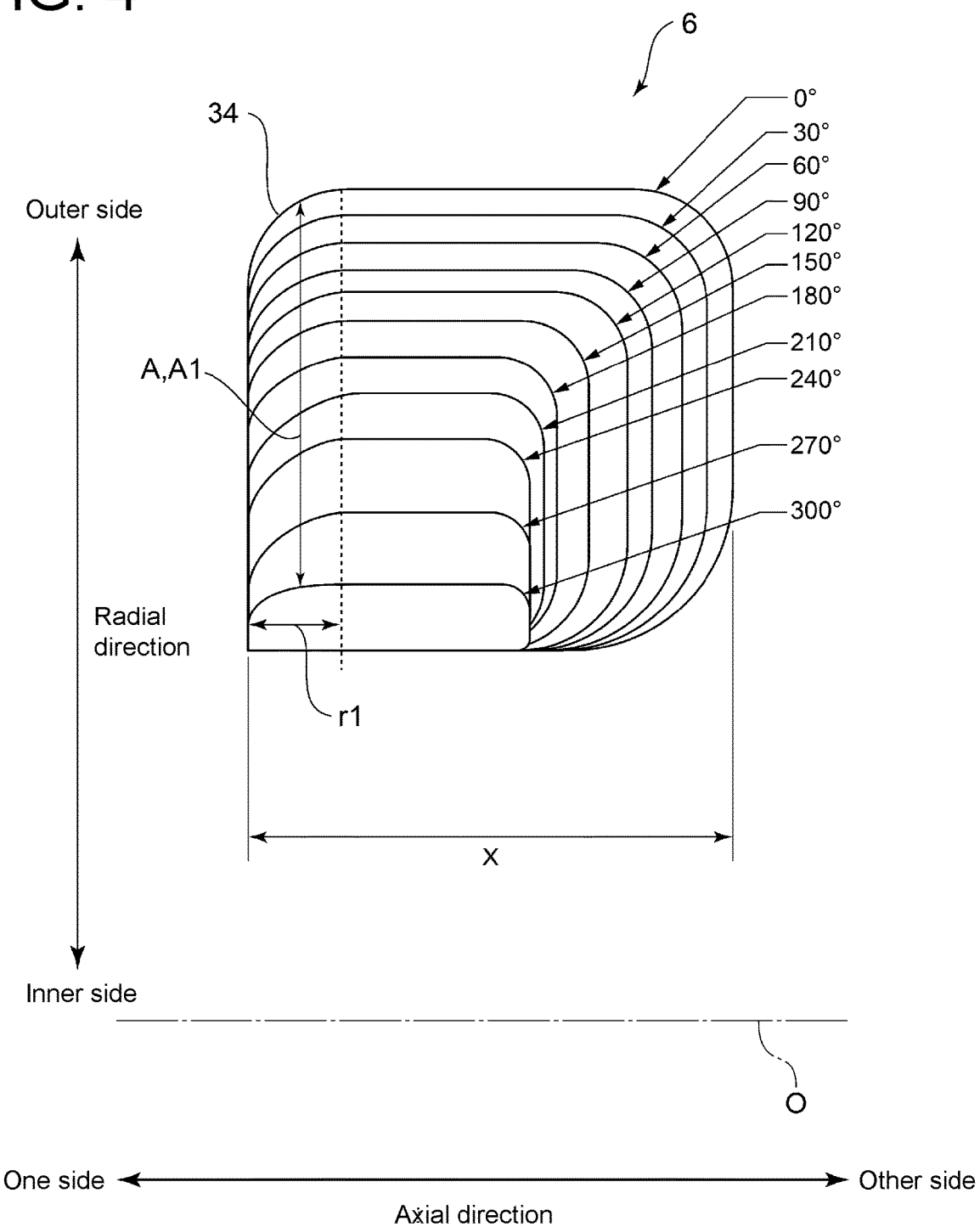
FIG. 4 is a diagram for describing the R ratio increasing region according to the first embodiment of the present disclosure.
Figure 5:
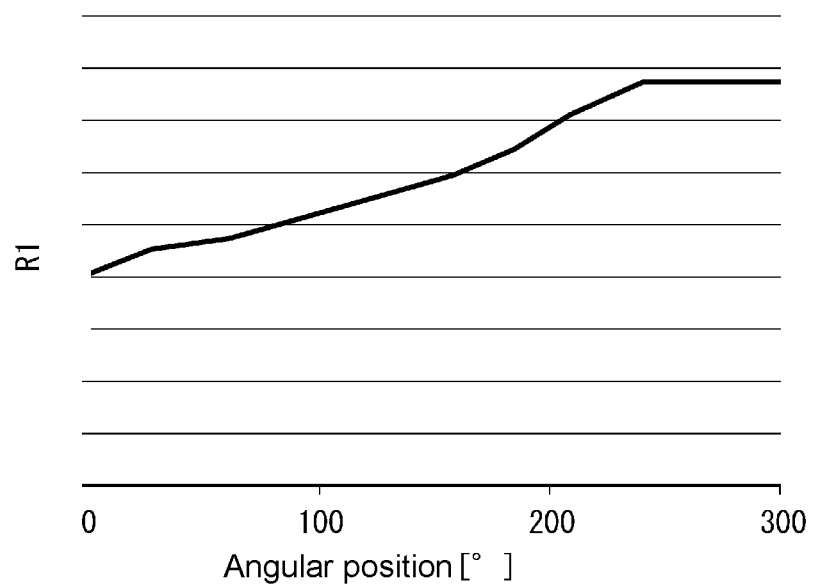
FIG. 5 is a diagram showing the relationship between the one-side outer peripheral R ratio and the angular position according to the first embodiment of the present disclosure.

FIG. 4 is a diagram for describing the R ratio increasing region according to the first embodiment of the present disclosure. FIG. 5 is a diagram showing the relationship between the one-side outer peripheral R ratio and the angular position according to the first embodiment of the present disclosure. FIG. 4 shows the cross-sections of the scroll passage 6 at angular positions of 0 degrees, 30 degrees, 60 degrees, 90 degrees, 120 degrees, 150 degrees, 180 degrees, 210 degrees, 240 degrees, 270 degrees, and 300 degrees. FIG. 5 shows the one-side outer peripheral R ratio R1 at angular positions of 0 degrees, 30 degrees, 60 degrees, 90 degrees, 120 degrees, 150 degrees, 180 degrees, 210 degrees, 240 degrees, 270 degrees, and 300 degrees.

As shown in FIG. 4, the scroll passage 6 has an R ratio increasing region A. The R ratio increasing region A includes a one-side outer peripheral R ratio increasing region A1. The one-side outer peripheral R ratio increasing region A1 is a region where the one-side outer peripheral R ratio R1 increases from upstream to downstream in the scroll passage 6. In the first embodiment, the R dimension r1 of the one-side outer peripheral R portion 34 is kept constant in a range where the angular position is 0 degrees to 300 degrees. On the other hand, the width dimension X of the scroll passage 6 decreases as the angular position moves from 0 degrees to 240 degrees, and is kept constant from 240 degrees to 300 degrees. Each of the other-side outer peripheral R ratio R2 and the other-side inner peripheral R ratio R3 may be configured to decrease as the angular position moves from 0 degrees to 300 degrees or may be kept constant.

Further, as shown in FIG. 5, the one-side outer peripheral R ratio R1 at an angular position of equal to or more than 180 degrees and less than 360 degrees may be larger than the one-side outer peripheral R ratio R1 at an angular position of equal to or more than 0 degrees and less than 180 degrees. In other words, the minimum value of the one-side outer peripheral R ratio R1 at an angular position of equal to or more than 180 degrees and less than 360 degrees may be larger than the maximum value of the one-side outer peripheral R ratio R1 at an angular position of equal to or more than 0 degrees and less than 180 degrees.

(Effect)

The effect of the turbine housing 1 according to the first embodiment of the present disclosure will be described. When the scroll passage 6 has a rectangular cross-sectional shape, the stress due to thermal expansion is concentrated on the corner portions (one-side outer peripheral R portion 34, other-side outer peripheral R portion 36, other-side inner peripheral R portion 38) of the scroll passage 6, and this stress may cause damage.

However, according to the first embodiment, the scroll passage 6 has the one-side outer peripheral R ratio increasing region A1 where the one-side outer peripheral R ratio R1 increases from upstream to downstream in the scroll passage 6. Thus, the one-side outer peripheral R portion 34 corresponding to the corner portion of the scroll passage 6 suppresses the concentration of stress due to thermal expansion and suppresses the damage to the scroll passage 6.

Further, according to findings of the present inventors, the stress due to thermal expansion is larger on the side closer to the bearing housing 102 (one side in the axial direction) of the scroll passage 6. According to the first embodiment, the R ratio increasing region A includes the one-side outer peripheral R ratio increasing region A1 formed on one side in the axial direction. Thus, it is possible to reduce the stress due to thermal expansion concentrated on the one-side outer peripheral R portion 34 corresponding to the corner portion of the scroll passage 6 on the side closer to the bearing housing 102 and suppress the damage to the scroll passage 6.

Figure 6:
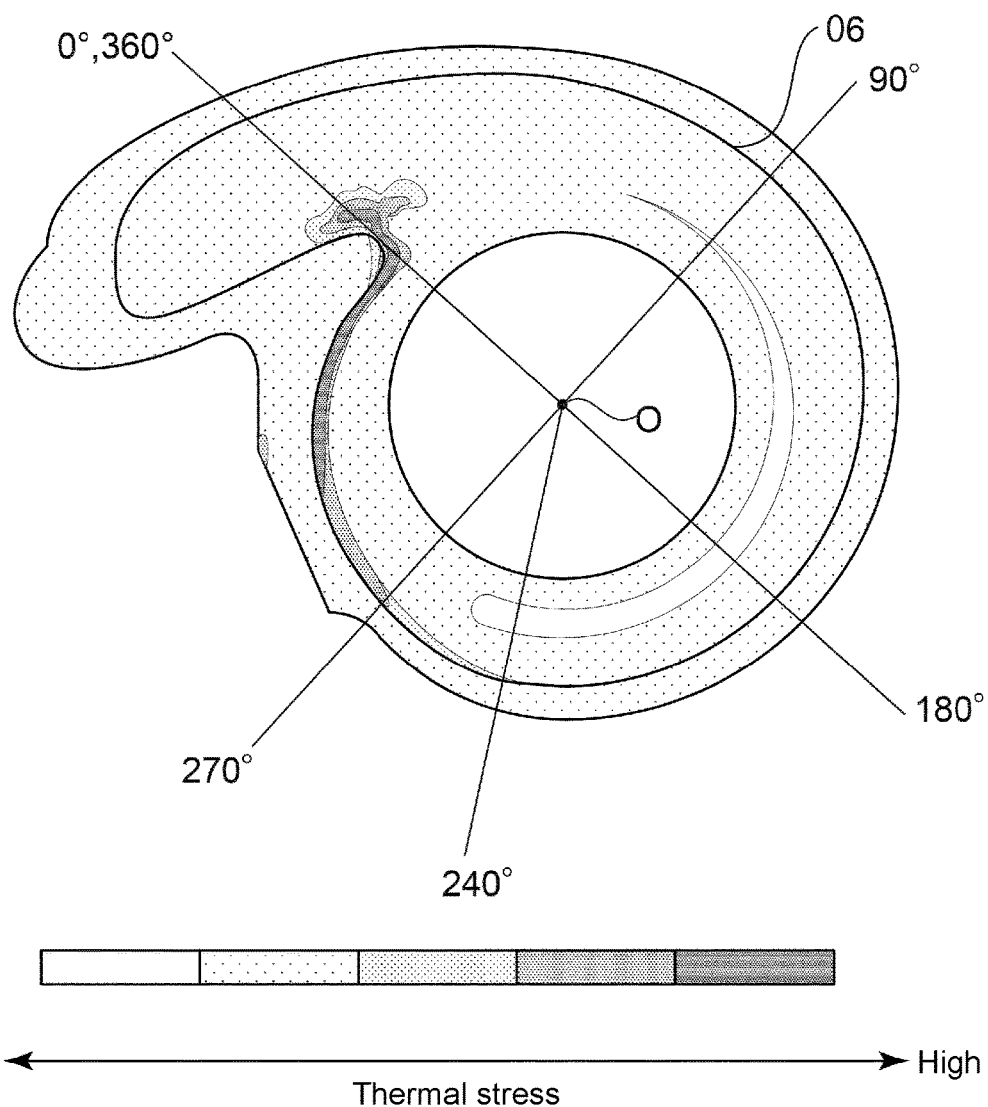
FIG. 6 is a thermal stress analysis diagram showing the distribution of the magnitude of thermal stress acting on a conventional scroll passage.

FIG. 6 is a thermal stress analysis diagram showing the distribution of the magnitude of thermal stress acting on a conventional scroll passage 06. As shown in FIG. 6, in the conventional scroll passage 06, the stress due to thermal expansion at an angular position of equal to or more than 180 degrees and less than 360 degrees is often higher than the stress due to thermal expansion at an angular position of equal to or more than 0 degrees and less than 180 degrees. In contrast, according to the first embodiment, as shown in FIG. 5, since the one-side outer peripheral R ratio R1 at an angular position of equal to or more than 180 degrees and less than 360 degrees is larger than the one-side outer peripheral R ratio R1 at an angular position of equal to or more than 0 degrees and less than 180 degrees, it is possible to reduce the stress due to thermal expansion concentrated on the portion of the one-side outer peripheral R portion 34 at an angular position of equal to or more than 180 degrees and less than 360 degrees and suppress the damage to the scroll passage 6.

Further, according to the first embodiment, since the R dimension r1 of the one-side outer peripheral R portion 34 is constant in a range where the angular position is equal to or more than 0 degrees and less than 300 degrees, the one-side outer peripheral R portion 34 can be easily formed, and the scroll passage 6 can be easily produced, as compared to the case where the R dimension r1 is not constant. In some embodiments, the R dimension r1 of the one-side outer peripheral R portion 34 is constant at least in a range where the angular position is equal to or more than 0 degrees and less than 240 degrees. In this case, at an angular position of equal to or more than 240 degrees, the R dimension r1 of the one-side outer peripheral R portion 34 may decrease downstream.

Further according to the first embodiment, since the turbocharger 100 is provided with the turbine housing 1 having the above-described effect, it is possible to reduce the risk of damage to the scroll passage 6 and extend the product life of the turbocharger 100.

The first embodiment has been described in conjunction with the case where the R ratio increasing region A includes the one-side outer peripheral R ratio increasing region A1 where the one-side outer peripheral R ratio R1 increases from upstream to downstream in the scroll passage 6, but the present disclosure is not limited to this embodiment. The scroll passage 6 of the turbine housing 1 according to the present disclosure has the R ratio increasing region A where at least one of the one-side outer peripheral R ratio R1, the other-side outer peripheral R ratio R2, and the other-side inner peripheral R ratio R3 increases from upstream to downstream in the scroll passage 6.

Second Embodiment

The turbine housing 1 according to the second embodiment of the present disclosure will be described. The second embodiment is different in that the R ratio increasing region A further includes an other-side outer peripheral R ratio increasing region A2, but the other configurations are the same as those described in the first embodiment. In the second embodiment, the same constituent elements as those in the first embodiment are associated with the same reference characters and thus not described again in detail.

Figure 7:
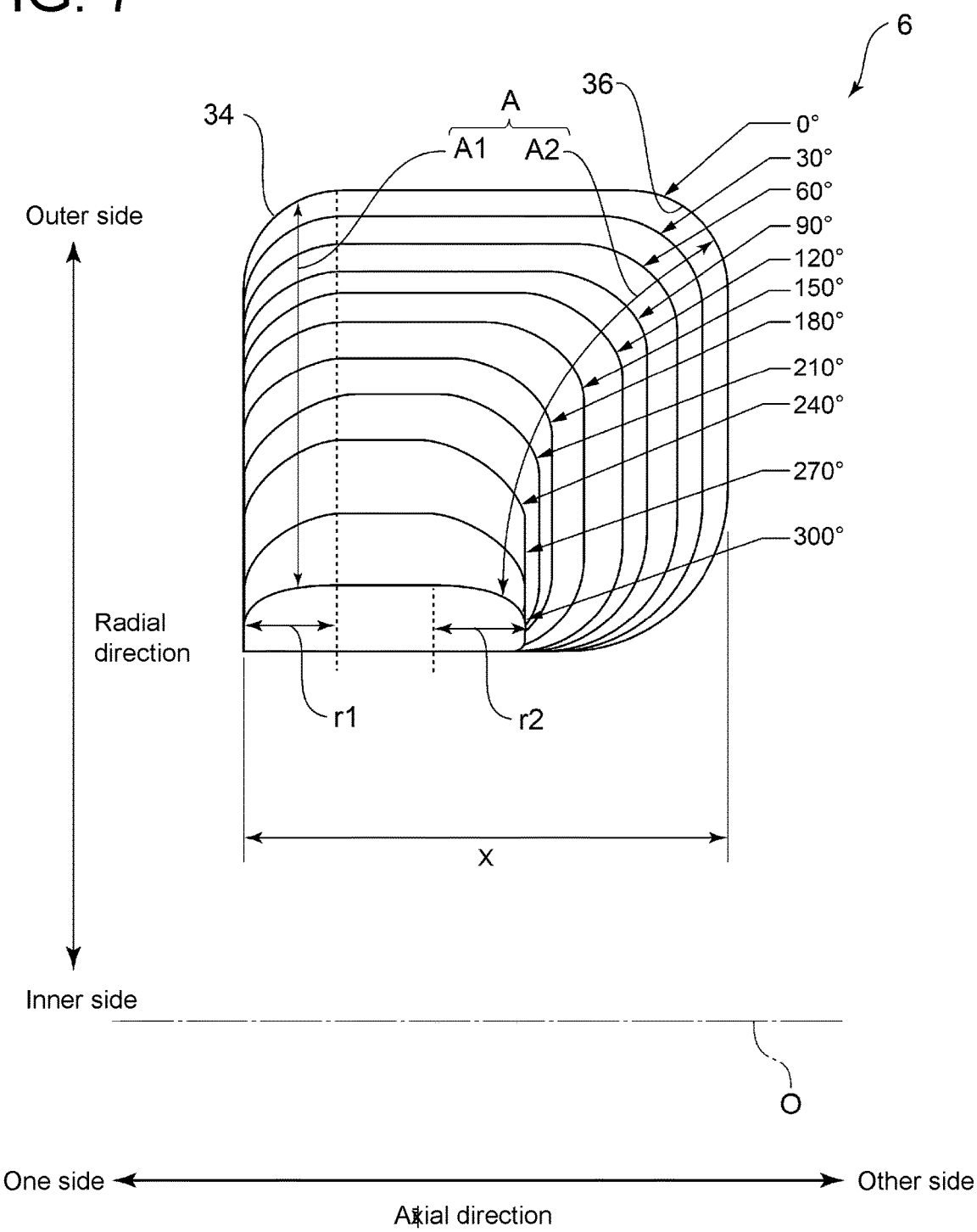
FIG. 7 is a diagram for describing the R ratio increasing region according to the second embodiment of the present disclosure.

FIG. 7 is a diagram for describing the R ratio increasing region according to the second embodiment of the present disclosure. As shown in FIG. 7, the scroll passage 6 has the R ratio increasing region A further including an other-side outer peripheral R ratio increasing region A2. The other-side outer peripheral R ratio increasing region A2 is a region where the other-side outer peripheral R ratio R2 increases from upstream to downstream in the scroll passage 6. In the second embodiment, the R dimension r2 of the other-side outer peripheral R portion 36 is kept constant in a range where the angular position is 0 degrees to 300 degrees.

Further, although not depicted, the other-side outer peripheral R ratio R2 at an angular position of equal to or more than 180 degrees and less than 360 degrees may be larger than the other-side outer peripheral R ratio R2 at an angular position of equal to or more than 0 degrees and less than 180 degrees. In other words, the minimum value of the other-side outer peripheral R ratio R2 at an angular position of equal to or more than 180 degrees and less than 360 degrees may be larger than the maximum value of the other-side outer peripheral R ratio R2 at an angular position of equal to or more than 0 degrees and less than 180 degrees.

According to the second embodiment, it is possible to reduce the stress due to thermal expansion concentrated on the other-side outer peripheral R portion 36 corresponding to the corner portion of the scroll passage 6 on the side closer to the outlet of the turbine housing 1 (other side in the axial direction) and suppress the damage to the scroll passage 6. Further, according to the second embodiment, it is possible to reduce the stress due to thermal expansion concentrated on the portion of the other-side outer peripheral R portion 36 at an angular position of equal to or more than 180 degrees and less than 360 degrees and suppress the damage to the scroll passage 6. Further, according to the second embodiment, since the R dimension r2 of the other-side outer peripheral R portion 36 is constant in a range where the angular position is equal to or more than 0 degrees and less than 300 degrees, the other-side outer peripheral R portion 36 can be easily formed, and the scroll passage 6 can be easily produced, as compared to the case where the R dimension r2 is not constant. In some embodiments, the R dimension r2 of the other-side outer peripheral R portion 36 is constant at least in a range where the angular position is equal to or more than 0 degrees and less than 240 degrees. In this case, at an angular position of equal to or more than 240 degrees, the R dimension r2 of the other-side outer peripheral R portion 36 may decrease downstream.

Further, in some embodiments, the scroll passage 6 may have an R ratio increasing region including a region where the other-side inner peripheral R ratio R3 increases from upstream to downstream in the scroll passage 6. In this case, the other-side inner peripheral R ratio r3 at an angular position of equal to or more than 180 degrees and less than 360 degrees may be larger than the other-side inner peripheral R ratio r3 at an angular position of equal to or more than 0 degrees and less than 180 degrees.

The contents described in the above embodiments would be understood as follows, for instance.

(1) A turbine housing (1) according to the present disclosure has a scroll passage (6). The scroll passage includes: an outer peripheral surface (26) extending along an axis (O) direction of the turbine housing; an inner peripheral surface (28) disposed inward of the outer peripheral surface in a radial direction of the turbine housing; a one-side surface (30), which is a side surface on one side in the axial direction of the turbine housing, extending along the radial direction of the turbine housing; an other-side surface (32), which is a side surface on another side in the axial direction of the turbine housing, disposed closer to an outlet of the turbine housing than the one-side surface and extending along the radial direction of the turbine housing; a one-side outer peripheral R portion (34) connecting an outer peripheral end (30b) of the one-side surface and a one-side end (26a) of the outer peripheral surface; an other-side outer peripheral R portion (36) connecting an outer peripheral end (32b) of the other-side surface and an other-side end (26b) of the outer peripheral surface; and an other-side inner peripheral R portion (38) connecting an inner peripheral end (32a) of the other-side surface and an other-side end (28b) of the inner peripheral surface. In a cross-sectional view of the scroll passage, when a ratio of a width dimension of the scroll passage along the axial direction to an R dimension (r1, r2, r3) of each of the one-side outer peripheral R portion, the other-side outer peripheral R portion, and the other-side inner peripheral R portion is defined as a one-side outer peripheral R ratio (R1), an other-side outer peripheral R ratio (R2), and an other-side inner peripheral R ratio (R3), respectively, the scroll passage has an R ratio increasing region (A) where at least one of the one-side outer peripheral R ratio, the other-side outer peripheral R ratio, and the other-side inner peripheral R ratio increases from upstream to downstream in the scroll passage.

When the scroll passage has a rectangular cross-sectional shape, the stress due to thermal expansion is concentrated on the corner portions of the scroll passage, and this stress may damage the scroll passage. However, according to the above configuration (1), the scroll passage has the R ratio increasing region where at least one of the one-side outer peripheral R ratio, the other-side outer peripheral R ratio, and the other-side inner peripheral R ratio increases from upstream to downstream in the scroll passage. Thus, at least one of the one-side outer peripheral R portion, the other-side outer peripheral R portion, and the other-side inner peripheral R portion corresponding to the corner portions of the scroll passage suppresses the concentration of stress due to thermal expansion and suppresses the damage to the scroll passage.

(2) In some embodiments, in the above configuration (1), the R ratio increasing region includes a one-side outer peripheral R ratio increasing region (A1) where the one-side outer peripheral R ratio increases from upstream to downstream in the scroll passage.

The stress due to thermal expansion is larger on the side closer to the bearing housing (one side in the axial direction) of the scroll passage. According to the above configuration (2), the R ratio increasing region includes the one-side outer peripheral R ratio increasing region where the one-side outer peripheral R ratio increases from upstream to downstream in the scroll passage. Thus, it is possible to reduce the stress due to thermal expansion concentrated on the one-side outer peripheral R portion corresponding to the corner portion of the scroll passage on the side closer to the bearing housing and suppress the damage to the scroll passage.

(3) In some embodiments, in the above configuration (1) or (2), the R ratio increasing region includes an other-side outer peripheral R ratio increasing region (A2) where the other-side outer peripheral R ratio increases from upstream to downstream in the scroll passage.

According to the above configuration (3), it is possible to reduce the stress due to thermal expansion concentrated on the other-side outer peripheral R portion corresponding to the corner portion of the scroll passage on the side closer to the outlet of the turbine housing (other side in the axial direction) and suppress the damage to the scroll passage.

(4) In some embodiments, in the above configuration (2), when an angular position of a winding start portion (20) of the scroll passage about an axis of the turbine housing is defined as 0 degrees, and an angular position of a winding end portion (20) of the scroll passage about the axis of the turbine housing is defined as 360 degrees, the one-side outer peripheral R ratio at an angular position of equal to or more than 180 degrees and less than 360 degrees is larger than the one-side outer peripheral R ratio at an angular position of equal to or more than 0 degrees and less than 180 degrees.

As shown in FIG. 6, the stress due to thermal expansion at an angular position of equal to or more than 180 degrees and less than 360 degrees is often higher than the stress due to thermal expansion at an angular position of equal to or more than 0 degrees and less than 180 degrees. According to the above configuration (4), since the one-side outer peripheral R ratio at an angular position of equal to or more than 180 degrees and less than 360 degrees is larger than the one-side outer peripheral R ratio at an angular position of equal to or more than 0 degrees and less than 180 degrees, it is possible to reduce the stress due to thermal expansion concentrated on the portion of the one-side outer peripheral R portion at an angular position of equal to or more than 180 degrees and less than 360 degrees and suppress the damage to the scroll passage.

(5) In some embodiments, in the above configuration (3), when an angular position of a winding start portion (20) of the scroll passage about an axis of the turbine housing is defined as 0 degrees, and an angular position of a winding end portion (20) of the scroll passage about the axis of the turbine housing is defined as 360 degrees, the other-side outer peripheral R ratio at an angular position of equal to or more than 180 degrees and less than 360 degrees is larger than the other-side outer peripheral R ratio at an angular position of equal to or more than 0 degrees and less than 180 degrees.

According to the above configuration (5), it is possible to reduce the stress due to thermal expansion concentrated on the portion of the other-side outer peripheral R portion at an angular position of equal to or more than 180 degrees and less than 360 degrees and suppress the damage to the scroll passage.

(6) In some embodiments, in the above configuration (4), when the angular position of the winding start portion (20) of the scroll passage about the axis of the turbine housing is defined as 0 degrees, and the angular position of the winding end portion (20) of the scroll passage about the axis of the turbine housing is defined as 360 degrees, the R dimension of the one-side outer peripheral R portion is constant at least in a range where the angular position is equal to or more than 0 degrees and less than 240 degrees.

According to the above configuration (6), since the R dimension of the one-side outer peripheral R portion is constant in a range where the angular position is equal to or more than 0 degrees and less than 240 degrees, the one-side outer peripheral R portion can be easily formed, and the scroll passage can be easily produced, as compared to the case where the R dimension is not constant.

(7) In some embodiments, in the above configuration (5), when the angular position of the winding start portion of the scroll passage about the axis of the turbine housing is defined as 0 degrees, and the angular position of the winding end portion of the scroll passage about the axis of the turbine housing is defined as 360 degrees, the R dimension of the other-side outer peripheral R portion is constant at least in a range where the angular position is equal to or more than 0 degrees and less than 240 degrees.

According to the above configuration (7), since the R dimension of the other-side outer peripheral R portion is constant in a range where the angular position is equal to or more than 0 degrees and less than 240 degrees, the other-side outer peripheral R portion can be easily formed, and the scroll passage can be easily produced, as compared to the case where the R dimension is not constant.

(8) A turbocharger (100) according to the present disclosure comprises the turbine housing described in any one of the above (1) to (7). According to the above configuration (8), since the turbine housing described in any one of the above (1) to (7) is included, it is possible to reduce the risk of damage to the scroll passage and extend the product life of the turbocharger.

Reference Signs List

| | |
|---|---|
| 1 | Turbine housing |
| 2 | Turbine rotor |
| 6 | Scroll passage |
| 12 | Introduction passage |
| 14 | Turbine chamber |
| 16 | Discharge passage |
| 18 | Exhaust gas inlet portion |
| 19a | Inlet portion of scroll passage |
| 19b | Outlet portion of scroll passage |
| 20 | Tongue portion |
| 24 | Communication passage |
| 26 | Outer peripheral surface |
| 26a | One-side end of outer peripheral surface |
| 26b | Other-side end of outer peripheral surface |
| 28 | Inner peripheral surface |
| 28a | One-side end of inner peripheral surface |
| 28b | Other-side end of inner peripheral surface |
| 30 | One-side surface |
| 30a | Inner peripheral end of one-side surface |
| 30b | Outer peripheral end of one-side surface |
| 32 | Other-side surface |
| 32a | Inner peripheral end of other-side surface |
| 32b | Outer peripheral end of other-side surface |
| 34 | One-side outer peripheral R portion |
| 36 | Other-side outer peripheral R portion |
| 38 | Other-side inner peripheral R portion |
| 100 | Turbocharger |
| 102 | Bearing housing |
| 104 | Compressor housing |
| A | R ratio increasing region |
| A1 | One-side outer peripheral R ratio increasing region |
| A2 | Other-side outer peripheral R ratio increasing region |
| G | Exhaust gas |
| O | Rotation axis |
| R1 | One-side outer peripheral R ratio |
| R2 | Other-side outer peripheral R ratio |
| R3 | Other-side inner peripheral R ratio |
| r1 | R dimension of one-side outer peripheral R portion |

| | Reference Signs List |
|---|---|
| r2 | R dimension of other-side outer peripheral R portion |
| r3 | R dimension of other-side inner peripheral R portion |
| X | Width dimension of scroll passage |

The invention claimed is:

1. A turbine housing, comprising a scroll passage, wherein the scroll passage includes:
    an outer peripheral surface extending along an axial direction of the turbine housing;
    an inner peripheral surface disposed inward of the outer peripheral surface in a radial direction of the turbine housing;
    a one-side surface which is a side surface on one side in the axial direction of the turbine housing, the one-side surface extending along the radial direction of the turbine housing;
    an other-side surface which is a side surface on another side in the axial direction of the turbine housing, the other-side surface being disposed closer to an outlet of the turbine housing than the one-side surface and extending along the radial direction of the turbine housing;
    a one-side outer peripheral R portion connecting an outer peripheral end of the one-side surface and a one-side end of the outer peripheral surface;
    an other-side outer peripheral R portion connecting an outer peripheral end of the other-side surface and an other-side end of the outer peripheral surface; and
    an other-side inner peripheral R portion connecting an inner peripheral end of the other-side surface and an other-side end of the inner peripheral surface,
    wherein, in a cross-sectional view of the scroll passage, a ratio of a width dimension of the scroll passage along the axial direction to an R dimension of each of the one-side outer peripheral R portion, the other-side outer peripheral R portion, and the other-side inner peripheral R portion is defined as a one-side outer peripheral R ratio, an other-side outer peripheral R ratio, and an other-side inner peripheral R ratio, respectively,
    the scroll passage has an R ratio increasing region where at least one of the one-side outer peripheral R ratio, the other-side outer peripheral R ratio, and the other-side inner peripheral R ratio increases from upstream to downstream in the scroll passage, and
    wherein, an angular position of a winding start portion of the scroll passage about an axis of the turbine housing is defined as 0 degrees, and an angular position of a winding end portion of the scroll passage about the axis of the turbine housing is defined as 360 degrees, and
    at least part of the angular range in which the R ratio increasing region is formed is included in the angular range from 0 degrees or more to 90 degrees or less.

2. The turbine housing according to claim 1,
    wherein the R ratio increasing region includes a one-side outer peripheral R ratio increasing region where the one-side outer peripheral R ratio increases from upstream to downstream in the scroll passage.

3. The turbine housing according to claim 1,
    wherein the R ratio increasing region includes an other-side outer peripheral R ratio increasing region where the other-side outer peripheral R ratio increases from upstream to downstream in the scroll passage.

4. The turbine housing according to claim 2,
    wherein, an angular position of a winding start portion of the scroll passage about an axis of the turbine housing is defined as 0 degrees, and an angular position of a winding end portion of the scroll passage about the axis of the turbine housing is defined as 360 degrees, and
    the one-side outer peripheral R ratio at an angular position of equal to or more than 180 degrees and less than 360 degrees is larger than the one-side outer peripheral R ratio at an angular position of equal to or more than 0 degrees and less than 180 degrees.

5. The turbine housing according to claim 3,
    wherein, an angular position of a winding start portion of the scroll passage about an axis of the turbine housing is defined as 0 degrees, and an angular position of a winding end portion of the scroll passage about the axis of the turbine housing is defined as 360 degrees, and
    the other-side outer peripheral R ratio at an angular position of equal to or more than 180 degrees and less than 360 degrees is larger than the other-side outer peripheral R ratio at an angular position of equal to or more than 0 degrees and less than 180 degrees.

6. The turbine housing according to claim 4,
    wherein, the angular position of the winding start portion of the scroll passage about the axis of the turbine housing is defined as 0 degrees, and the angular position of the winding end portion of the scroll passage about the axis of the turbine housing is defined as 360 degrees, and
    the R dimension of the one-side outer peripheral R portion is constant at least in a range where the angular position is equal to or more than 0 degrees and less than 240 degrees.

7. The turbine housing according to claim 5,
    wherein, the angular position of the winding start portion of the scroll passage about the axis of the turbine housing is defined as 0 degrees, and the angular position of the winding end portion of the scroll passage about the axis of the turbine housing is defined as 360 degrees, and
    the R dimension of the other-side outer peripheral R portion is constant at least in a range where the angular position is equal to or more than 0 degrees and less than 240 degrees.

8. A turbocharger, comprising:
    the turbine housing according to claim 1.

* * * * *